(12) United States Patent
Dai et al.

(10) Patent No.: US 11,534,996 B2
(45) Date of Patent: Dec. 27, 2022

(54) TURN-UP DEVICE AND TIRE BUILDING METHOD USING TURN-UP DEVICE

(71) Applicants: Eve Rubber Institute Co., Ltd, Shandong (CN); Mesnac Co., Ltd., Shandong (CN)

(72) Inventors: Deying Dai, Shandong (CN); Qingyong Bu, Shandong (CN); Zhao Sun, Shandong (CN); Suxia Tian, Shandong (CN); Dan Qin, Shandong (CN)

(73) Assignees: Mesnac Co., Ltd., Shandong (CN); Eve Rubber Institute Co., Ltd, Shandong (CN)

(*) Notice: Subject to any disclaimer, the term of this patent is extended or adjusted under 35 U.S.C. 154(b) by 886 days.

(21) Appl. No.: 16/303,390

(22) PCT Filed: May 19, 2017

(86) PCT No.: PCT/CN2017/085157
§ 371 (c)(1),
(2) Date: Nov. 20, 2018

(87) PCT Pub. No.: WO2017/202260
PCT Pub. Date: Nov. 30, 2017

(65) Prior Publication Data
US 2021/0268759 A1    Sep. 2, 2021

(30) Foreign Application Priority Data

May 23, 2016  (CN) .......................... 201610344947.3
May 23, 2016  (CN) .......................... 201610347963.8

(51) Int. Cl.
*B29D 30/32*  (2006.01)

(52) U.S. Cl.
CPC ...... *B29D 30/32* (2013.01); *B29D 2030/3214* (2013.01)

(58) Field of Classification Search
CPC ............ B29D 2030/3278; B29D 30/32; B29D 2030/325; B29D 2030/3214
See application file for complete search history.

(56) References Cited

U.S. PATENT DOCUMENTS 3,438,832 A * 4/1969 Armindo .............. B29D 30/247
156/401
3,765,986 A * 10/1973 Brey ...................... B29D 30/32
156/400

(Continued)

FOREIGN PATENT DOCUMENTS

CN    201183320 Y    1/2009
CN    201296054 Y    8/2009

(Continued)

OTHER PUBLICATIONS

CN201183320 ESpaceNet Translation (Year: 2021).*
U.S. Pat. No. 3,765,986 Description from Search (Year: 1973).*

*Primary Examiner* — Katelyn W Smith
*Assistant Examiner* — Alexander D Booth
(74) *Attorney, Agent, or Firm* — Fishman Stewart PLLC

(57) ABSTRACT

A turn-up device, comprising a building machine main shaft, an outer sleeve device, a ply down finger assembly, a bladder device, a bead setting device, and a bead locking device. The outer sleeve device, the ply down finger assembly and the bladder device are all sleeved on the building machine main shaft. The outer sleeve device is located on the outer sides of the ply down finger assembly and the bladder device along the radial direction of the building machine main shaft. The bead setting device is located on the outer sleeve device. A tire building method using the turn-up device can improve the building quality of tire beads, improve the service life of capsule, and provide promising precision of carcass.

6 Claims, 4 Drawing Sheets

(56) References Cited

U.S. PATENT DOCUMENTS

| | | | | |
|---|---|---|---|---|
| 4,149,927 | A | * | 4/1979 | Lauer, Jr. ............... B29D 30/32 156/415 |
| 4,584,038 | A | * | 4/1986 | Enders .................. B29D 30/32 156/132 |
| 5,445,695 | A | * | 8/1995 | Ozawa .................. B29D 30/32 156/401 |
| 2011/0186207 | A1 | * | 8/2011 | Mancini ................ B29D 30/32 156/110.1 |
| 2015/0114571 | A1 | * | 4/2015 | Weaver ............... B29D 30/245 156/415 |

FOREIGN PATENT DOCUMENTS

| | | | |
|---|---|---|---|
| CN | 101633245 A | | 1/2010 |
| CN | 203665976 U | | 6/2014 |
| CN | 104742395 A | | 7/2015 |
| CN | 105818407 A | | 8/2016 |
| CN | 105922616 A | | 9/2016 |
| CN | 105965925 A | | 9/2016 |
| CN | 105965926 A | | 9/2016 |
| CN | 105965927 A | | 9/2016 |
| CN | 106042429 A | | 10/2016 |
| JP | 2008296406 A | | 12/2008 |
| WO | WO-2014203211 A | * 12/2014 | ........... B29D 30/246 |

\* cited by examiner

TURN-UP DEVICE AND TIRE BUILDING METHOD USING TURN-UP DEVICE

CROSS-REFERENCE TO RELATED APPLICATIONS

This application claims priority to China Patent Application Nos. CN 201610344947.3 filed May 23, 2016, CN 201610347963.8 filed May 23, 2016, and International Patent Application No. PCT/CN2017/085157 filed May 19, 2017, all of which are hereby incorporated by reference in their entirety.

FIELD OF THE DISCLOSURE

The present disclosure relates to the field of tire building technology, and in particular to a turn-up device and a tire building method using the turn-up device.

BACKGROUND OF THE DISCLOSURE

There is an important step in tire building process, which involves turn-down and turn-up processes of a carcass material. Especially in the turn-up process, the turn-up is performed by using a bladder in the majority of processes, but the traditional bladder cannot rotate together with a building drum, so that the carcass material is worn by the friction with the bladder in the building process. Also, the component structural ratio of the bladder is not good, resulting in serious wear of the turn-up bladder in the turn-up process of tire, and causing a larger pressure to the control of production cost.

In addition, after the turn-down process, bead setting should be performed on an apex bead ring before the turn-up process, in the traditional bead setting process, as the bead setting structure is too simple, the apex bead ring is not firmly bonded, and bead setting members are also severely worn.

Moreover, due to the improper manufacturing process and improper material selection of a building machine main shaft and a main shaft of the turn-up device, the main shafts are prone to premature wear and damage, such that the production cost is increased.

SUMMARY OF THE DISCLOSURE

An object of the present disclosure is to provide a turn-up device, which can achieve turn-down and turn-up processes. A tire building method using the turn-up device is also provided for reducing the wear of a turn-up bladder, reducing the wear of a bead setting component, firmly bonding the apex rubber, reducing the wear of the main shaft, improving production efficiency and reducing production cost.

One aspect of the present disclosure provides a turn-up device, comprising a building machine main shaft, an outer sleeve device A, a ply down finger assembly B, a bladder device C, a bead setting device D, and a bead locking device E, wherein the outer sleeve device A, the ply down finger assembly B and the bladder device C are all sleeved on the building machine main shaft, and the outer sleeve device is located on the outer sides of the ply down finger assembly and the bladder device along the radial direction of the building machine main shaft; and the bead setting device is located on the outer sleeve device.

In one example, an outer sleeve device may comprise: an outer sleeve frame body, a auxiliary push sleeve and a auxiliary push disk; the outer sleeve frame body comprises a sleeving portion and a supporting portion; the sleeving portion is sleeved on the building machine main shaft; the supporting portion is arranged on the sleeving portion; a auxiliary push disk driving device is mounted at the outside of the supporting portion; and one end of the auxiliary push sleeve is mounted at the end of the supporting portion, and the auxiliary push disk is mounted on the other end of the auxiliary push sleeve.

A ply down finger assembly may comprise a finger paddle mounting sleeve, and the finger paddle mounting sleeve is sleeved on the building machine main shaft; a finger paddle mounting seat and a finger paddle push disk are arranged on the finger paddle mounting sleeve, and a finger paddle is mounted on the finger paddle mounting seat in a hinging manner; a spring is mounted on the finger paddle push disk; one end of the spring is connected with the finger paddle; the finger paddle push disk is driven by a finger paddle driving device; and the finger paddle driving device is connected to the finger paddle push disk and penetrates through the supporting portion of the outer sleeve device.

A bladder device may comprise a sealing inner sleeve, a sealing outer sleeve and a connecting piece; the sealing inner sleeve is sleeved on the building machine main shaft, and the sealing outer sleeve is sleeved at the outside of the sealing inner sleeve; a piston is sleeved at the outside of the sealing outer sleeve, and a cylinder body is sleeved at the outside of a piston; a bladder seat is mounted on the cylinder body; a bladder is mounted on the bladder seat.

A bladder device may further comprise: a first chuck, a second chuck and a bracket; the first chuck and the second chuck seal and fix the bladder on the bladder seat; and a bracket mounted on the second chuck.

A bead setting device may be mounted on the inner side of the other end of the auxiliary push sleeve; the bead setting device comprises a bead setting driving device and a clamping jaw; the clamping jaw is driven by the bead setting driving device; and a bead setting portion is arranged at an end of the clamping jaw, and the bead setting portion is a circular arc surface or an inclined plane.

A bead locking device may comprise: a locking block, a mandril, a sliding disk, and a supporting member; the sliding disk is located at the outside of the sealing outer sleeve; the sliding disk has an inclined plane, and the bottom of the mandril abuts against the inclined plane of the sliding disk through a rolling mechanism; the upper part of the mandril is supported by the supporting member, and the supporting member is fixedly connected to the cylinder body; the locking block is arranged at the top of the mandril; and the sliding disk is connected with the end of the piston. The piston is mounted on the outer side of the sealing outer sleeve, and the cylinder body is mounted on the outer side of the piston.

The tire building machine may further comprise: a connecting rod and a flange plate; one end of the connecting rod is mounted on the flange plate, and the other end successively penetrates through the finger paddle mounting seat, the finger paddle push disk and the supporting portion; and the flange plate is connected with the sealing inner sleeve.

The bladder may comprise an inner rubber layer, an inner ply layer, an outer ply layer and an outer rubber layer from the inside to the outside, and a silica gel layer is arranged at a portion corresponding to a bead on the outer side of the bladder; the components of the outer rubber layer may comprise: 70-90% by mass of styrene-isobutylene-styrene and 10-30% by mass of polyamide polymers, and the outer rubber layer is cooled at 10-100° C. for 100-260 seconds after being vulcanized; and the inner rubber layer comprises an inner rubber layer I and an inner rubber layer II, which are independent from each other and are both made of natural rubber, the two inner rubber layers have the same thickness, and the inner rubber layers are filled with carbon black.

A manufacturing method of the building machine main shaft may include one or more of the following steps:

step 1: selecting the raw materials of the building machine main shaft;

step 2: performing first time heating: placing a workpiece in a furnace for heating, controlling the temperature in the furnace as 1000-1200° C., and performing heat preservation for 3 hours;

step 3: performing first time building: taking out the workpiece from the furnace, and upsetting the workpiece to a first size by using upper and lower flat anvils via a wide anvil compaction forging method;

step 4: performing second time heating: placing the workpiece in the furnace for heating, performing heat treatment (secondary recrystallization normalizing and tempering), and then performing heating and cooling treatment for three times;

step 5: performing second time building: taking out the workpiece from the furnace, and upsetting the workpiece to a second size by using the upper and lower flat anvils via the wide anvil compaction forging method;

step 6: performing cutting, grinding and flaw detection: performing flaw detection and grinding on the workpiece with the second size, ensuring that the roughness of the ground place is higher than 12, and then performing first time flaw detection;

step 7: performing rough turning: performing rough turning, so that the roughness of the outer surface of the workpiece is higher than 15, and then performing second time flaw detection; and step 8: performing finish turning: performing the finish turning to obtain a finished product main shaft.

In step 4, the heat treatment may comprise one or more of the following steps:

Placing the workpiece in the furnace, ensuring that the temperature in the furnace is 400-420° C. when the workpiece is placed in the furnace, heating up to 900-950° C., performing the heat preservation for 10 hours, wherein the temperature increment per hour is less than or equal to 850° C. in the heating up process, then performing air cooling for 3 hours to reduce the furnace temperature to 300-350° C., and performing the heat preservation for 10 hours;

then, heating up to 800-900° C., performing the heat preservation for 10 hours, wherein the temperature increment per hour is less than or equal to 50° C. in the heating up process, then performing air cooling for 3 hours to reduce the furnace temperature to 300-350° C., and performing the heat preservation for 10 hours; and thereafter, when the temperature in the furnace drops below 150° C., taking out the workpiece from the furnace.

The chemical element contents of the building machine main shaft may be as follows: C: 0.3-0.45%, Si: 0.27-0.35%, Mn: 0.80-1.50%, P: 0.01-0.020%, S: 0.002-0.020%, Cr: ≤1.20%, Ni: 0.15-0.30%, Mo: 0.23-0.25%, Cu: ≤0.15%, Al: 0.025-0.035%, and the balance is Fe.

The turn-up device is located on a tire transfer machine, and the tire transfer machine comprises a transfer ring device G, a supporting device H, a rotating device, the turn-up device, a balancing device and a base device.

The rotating device is mounted above the base device, the turn-up device is mounted on one side of the rotating device, and the supporting device is mounted on the other side of the rotating device; the transfer ring device is mounted on the supporting device; and the transfer ring device, the supporting device, the rotating device and the turn-up device can rotate together.

The balancing device is mounted on the supporting device; and a balance seat is mounted on the base device, and the balancing device is supported on the balance seat in a manner of capable of leaving.

The transfer ring device may comprise a first transfer ring, a second transfer ring and a third transfer ring; and the first transfer ring, the second transfer ring and the third transfer ring are successively mounted on a transfer ring bracket bottom plate.

The supporting device may comprise: a first transfer ring bracket, a second transfer ring bracket, and the transfer ring bracket bottom plate; one side of the first transfer ring bracket and one side of the second transfer ring bracket are mounted on the rotating device; and the bottoms of the first transfer ring bracket and the second transfer ring bracket are connected with the transfer ring bracket bottom plate.

The balancing device is mounted on the transfer ring bracket bottom plate, and may comprise: a roller, a roller seat and an oil cylinder; the roller is mounted on the roller seat, the roller seat is mounted on the oil cylinder through a guiding shaft, and the oil cylinder is mounted on the transfer ring bracket bottom plate; and the roller is supported on the balance seat.

The tire building machine may further comprise a limiting device, and the limiting device comprises two limiting rods; one end of each limiting rod is connected to the roller seat, and the other end is connected to the transfer ring bracket bottom plate.

The tire building machine may further comprise a driving device, and the driving device is mounted on the base device; the driving device comprises: a servo motor, a gear, a rack, a base and a guiding device; the servo motor drives the gear to rotate, the gear is engaged with a rack plate, the lower side of the guiding device is sleeved on the base, and the upper side of the guiding device is mounted on the base device.

Another aspect of the present disclosure provides a tire building method using the turn-up device, the method comprising one or more of the following steps:

step 1-1: sleeving a carcass assembly on a carcass drum;

step 1-2: respectively performing turn-down on the two sides of the carcass assembly by using a first turn-up device and a second turn-up device;

step 1-3: respectively performing bead setting on the two sides of the carcass assembly by using the first turn-up device and the second turn-up device;

step 1-4: respectively performing bead locking on the two sides of the carcass assembly by using the first turn-up device and the second turn-up device;

step 1-5: respectively performing turn-up on the two sides of the carcass assembly by using the first turn-up device and the second turn-up device; and step 1-6: completing all turn-up processes of the carcass assembly to obtain a first carcass assembly.

The turn-down procedure in step 1-2 may comprise a step 2.1.

The turn-up device moves integrally along the axial direction of the building machine main shaft toward the carcass drum, and the outer sleeve device stops moving when the turn-up device arrives at a first distance away from the carcass drum; however, the ply down finger assembly and the device thereon, and the bladder device and the device thereon continue to move along the axial direction of the building machine main shaft toward the carcass drum; at this time, the finger paddle on the ply down finger assembly rotates along a hinge shaft, and the top thereof scatters; and the edge portion of the carcass assembly to be subjected to the turn-up procedure is just located on the inner side of the finger paddle.

The turn-down procedure in step 1-2 may comprise a step 2.2, which is executed after step 2.1.

The outer sleeve device moves toward the carcass drum, and the auxiliary push sleeve on the outer sleeve device comes into contact with the finger paddle, so that the finger paddle rotates around the hinge shaft and tucks; and in the tucking process, the finger paddle abuts the edge portion of the carcass assembly against the bladder.

The bead setting step in step 1-3 may comprise one or more of the following steps:

An apex bead ring is arranged at an end of a clamping jaw of the bead setting device; the bead setting driving device pushes the clamping jaw, and the clamping jaw pushes the apex bead ring to the set position of the carcass assembly; and then, the clamping jaw returns to the original position under the drive of the bead setting driving device, thus completing the bead setting operation.

After the above step, the outer sleeve device and the ply down finger assembly simultaneously move toward a direction away from the carcass drum for a distance.

The bead locking step in step 1-4 may comprise: the piston which moves toward the carcass drum, then pushes the sliding disk toward the carcass drum along the axial direction, so that the mandril rises, and the locking block at the top of the mandril closely abuts the bladder against the carcass assembly.

The turn-up step in step 1-5 may comprise: the bladder which is inflated to expand and extrudes the carcass assembly upward toward the carcass drum, and at the same time, the auxiliary push disk pushes the expanded bladder to the carcass drum so as to turn up the carcass assembly to the outer side of the apex bead ring.

Compared with the prior systems, the turn-up device and the tire building method using the turn-up device of the present disclosure and may have the following advantages:

1. The turn-up bladder can rotate together with the carcass drum which facilitates their fitting, and meanwhile, no wrinkle is generated during the turn-up, so that the building quality at the bead opening is improved.

2. Due to the special hierarchical structure and the component selection of the bladder, the air resistance and the air permeability of the bladder, the adhesion performance between the layers of the bladder, and the service life and toughness of the bladder are improved.

3. In the bead setting process, the bead setting portion is in close fit with the apex bead ring, and finally, there is no axial or radial offset of the bead ring after the bead setting device is removed, so that the building quality of the tire is improved.

4. For the building main shaft, the special component selection of the building process improves the hardness and strength of the building main shaft and prolongs the service life of the equipment.

5. The distances among the three transfer rings are adjusted to meet the requirements for clamping tires of different specifications.

6. A roller supporting structure is arranged on the supporting device to ensure the height of the transfer ring device and ensure the degree of overlap of the transfer ring center and the building drum center, thereby ensuring the transfer precision of the carcass.

7. By adjusting the length of the limiting device on the supporting device, the height range of the supporting device when it is lifted and lowered can be adjusted, and the applicable range of the equipment is improved.

8. By mounting the gear and the rack plate structure on the driving device, the whole tire building device can move along a straight line, thus ensuring that the tire building device is aligned with the building drum and the carcass drum, and ensuring that the transfer ring device can be accurately sleeved on the building drum and the carcass drum.

DETAILED DESCRIPTION OF THE EMBODIMENTS

Figure 1:
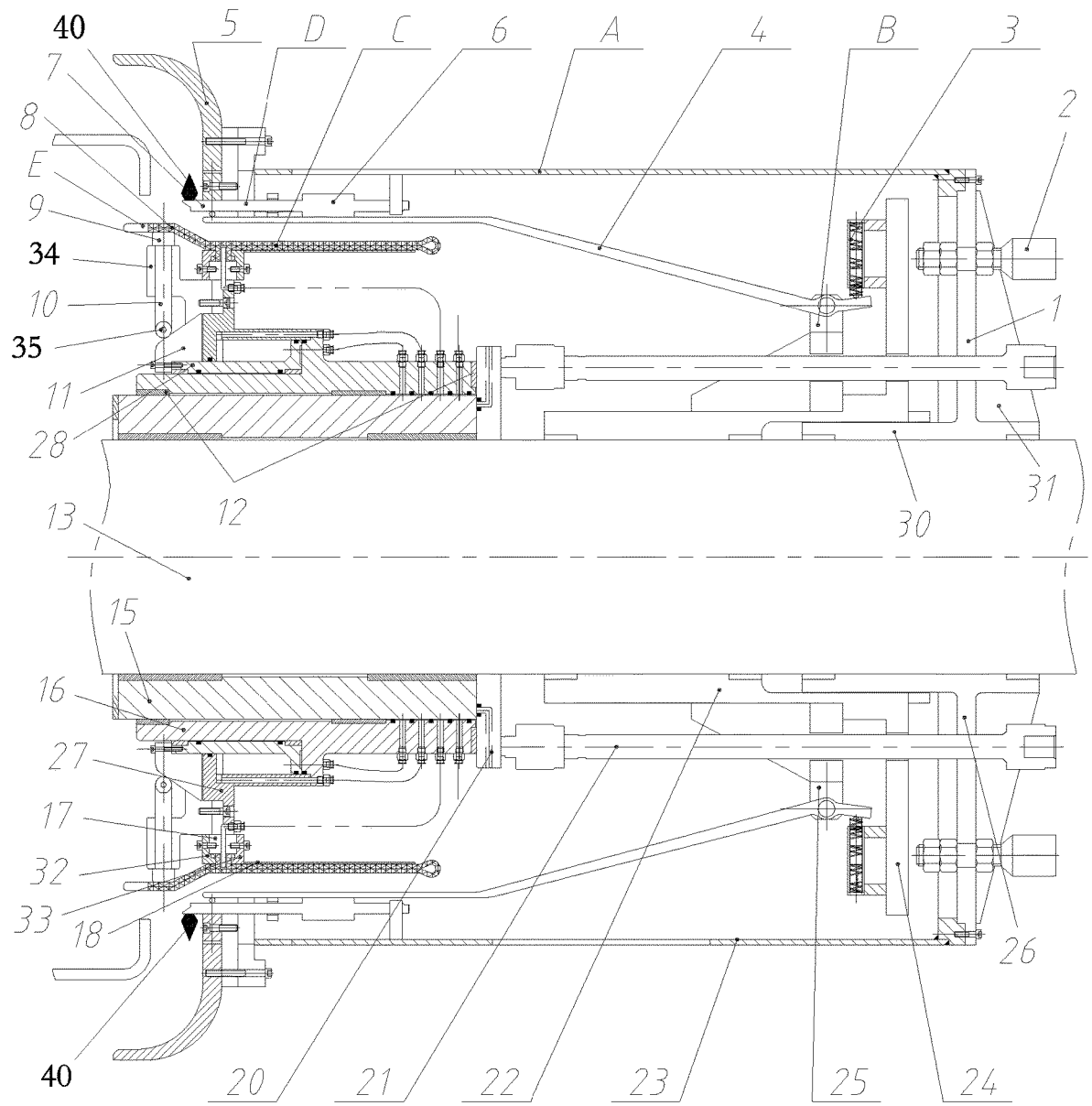
FIG. 1 is a structural schematic diagram of a turn-up device in the turn-down and turn-up processes according to the present disclosure.
Figure 2:
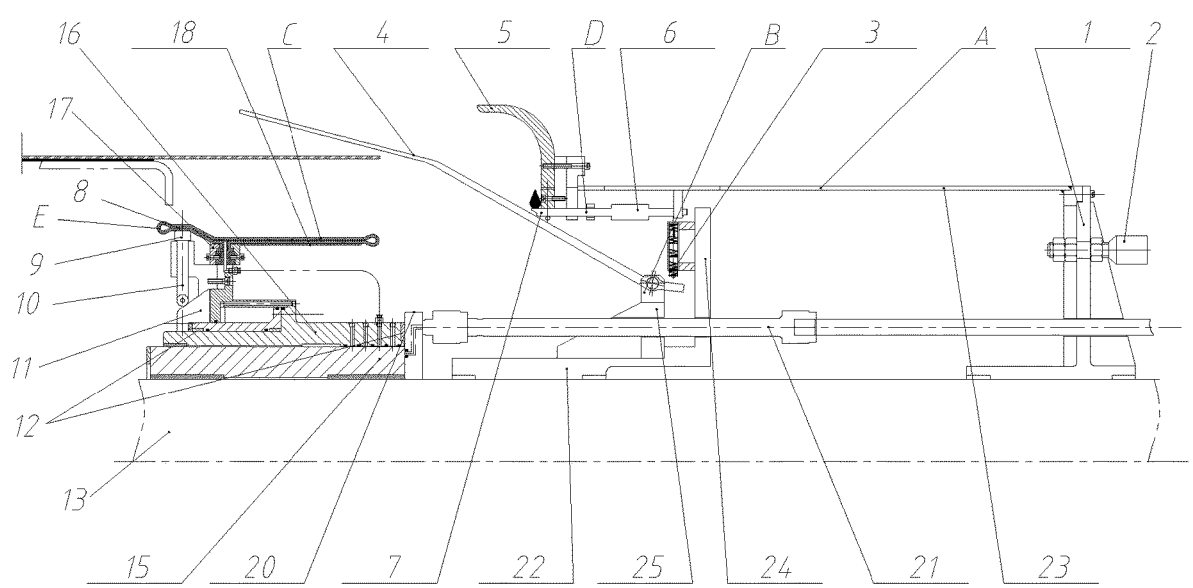
FIG. 2 is a schematic diagram when a finger paddle in the turn-up device in the turn-down and turn-up processes according to the present disclosure splays.
Figure 3:
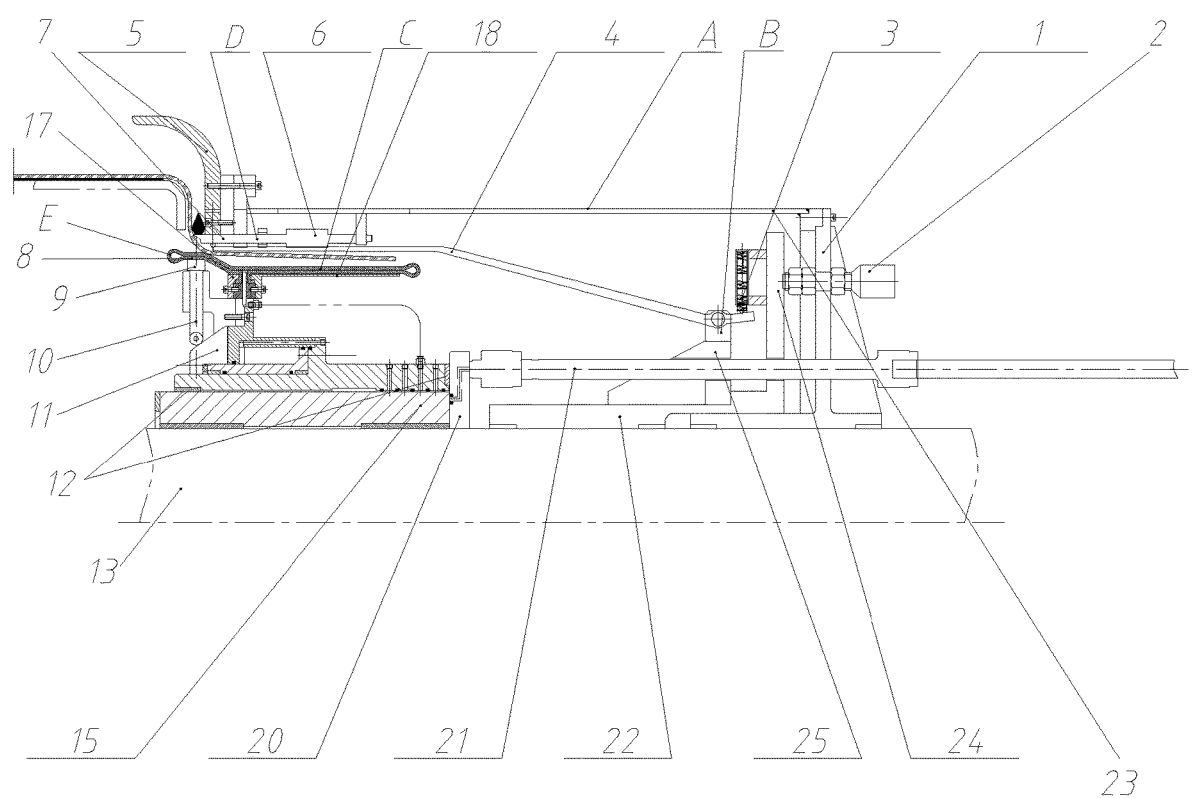
FIG. 3 is a schematic diagram of a bead setting process in the turn-down and turn-up processes according to the present disclosure.
Figure 4:
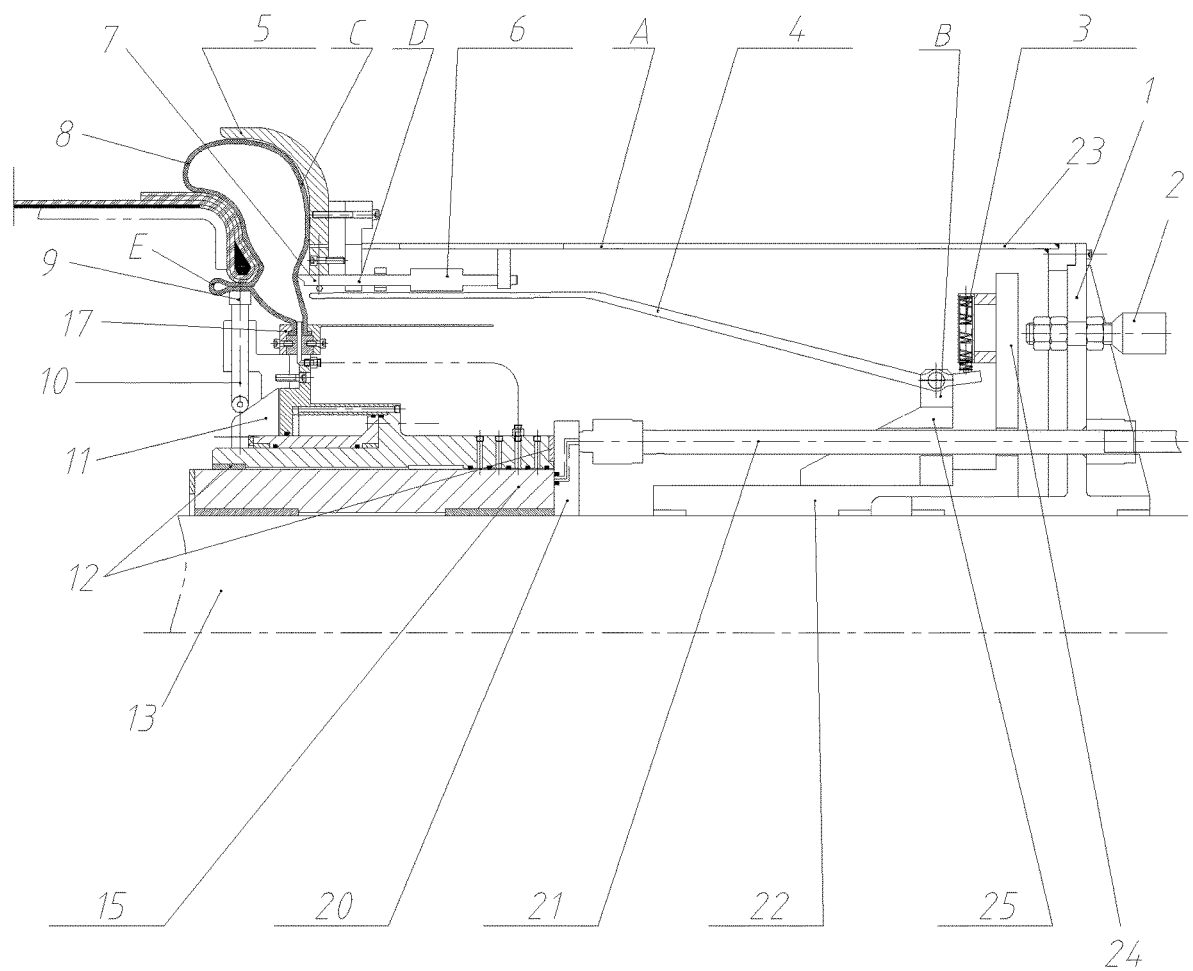
FIG. 4 is a schematic diagram of bladder inflation turn-up in the turn-down and turn-up processes according to the present disclosure.

The present disclosure is further described below in combination with drawing FIGS. 1-4.

I. First Carcass Transfer Device

1. Overall Structure of a Tire Building Machine

The tire building machine comprises a transfer ring device, a supporting device, a rotating device, a turn-up device, a balancing device and a base device; the rotating device is mounted above the base device, the turn-up device is mounted on one side of the rotating device, and the supporting device is mounted on the other side of the rotating device; the transfer ring device is mounted on the supporting device; and the transfer ring device, the supporting device, the rotating device and the turn-up device can rotate together; the balancing device is mounted on the supporting device; and a balance seat is mounted on the base device, and the balancing device is supported on the balance seat in a separable manner.

2. The Transfer Ring Device

The transfer ring device comprises a first transfer ring, a second transfer ring and a third transfer ring; and the first transfer ring, the second transfer ring and the third transfer ring are successively mounted on a transfer ring bracket bottom plate. In the present disclosure, three transfer rings are used for respectively clamping the two ends and the middle of the carcass, so that the carcass does not deform when the carcass is clamped. Meanwhile, compared with the manual transfer mode, the carcass can be accurately located.

A position adjustment device is mounted between each transfer ring, and the position adjustment device is a lead screw structure that can adjust the distances among the three transfer rings to meet the requirements of clamping tire with different size specifications.

3. The Supporting Device

The supporting device comprises: a first transfer ring bracket, a second transfer ring bracket, and the transfer ring bracket bottom plate; one side of the first transfer ring bracket and one side of the second transfer ring bracket are mounted on the rotating device; and the bottoms of the first transfer ring bracket and the second transfer ring bracket are connected with the transfer ring bracket bottom plate.

4. The Balancing Device

The balancing device is mounted on the transfer ring bracket bottom plate, and comprises: a roller, a roller seat and an oil cylinder; the roller is mounted on the roller seat, the roller seat is mounted on the oil cylinder through a guiding shaft, and the oil cylinder is mounted on the transfer ring bracket bottom plate.

After the transfer ring device clamps a green tire, as the carcass is very heavy, the supporting device inevitably sags under the effect of gravity. At this time, the piston rod of the oil cylinder on the balancing device extends out, so that the roller connected thereto is supported on the balance seat; the first transfer ring, the second transfer ring and the third transfer ring are lifted to necessary heights, which ensures that the centers of the three transfer rings overlaps with the center of the building drum in the next procedure, thereby ensuring the transfer precision of the carcass.

5. Limiting Device

The tire building machine further comprises a limiting device, and the limiting device comprises two limiting rods, which are respectively mounted on two sides of the roller seat; one end of each limiting rod is fixedly connected to the roller seat through two nuts, wherein a first nut is located above the roller seat, and a second nut is located blew the roller seat. The other end of each limiting rod is connected to the transfer ring bracket bottom plate through a third nut, and the third nut is located above the transfer ring bracket bottom plate. By adjusting the position of the third nut, the length of the limiting rod located between the third nut and the second nut can be adjusted, so that the stroke of the oil cylinder can be adjusted, and then the height range of the roller when it is lifted and lowered can be adjusted.

6. Driving Device

The tire building machine further comprises a driving device, the driving device is mounted on the base device, and the driving device comprises: a servo motor, a gear, a rack, a base and a guiding device. The servo motor drives the gear to rotate, the gear is engaged with the rack, the lower side of the guiding device is sleeved on the base, and the upper side of the guiding device is mounted on the base device. A supporting roller is further mounted on the base device to drive the first carcass transfer device to move on a supporting guide rail.

Therefore, when the servo motor drives the gear to rotate, due to the guiding function of the gear, the rack, the base and the guiding device, the supporting roller linearly moves on the supporting guide rail to ensure that the tire building device is aligned with the building drum and the carcass drum and that the transfer ring device can be accurately sleeved on the building drum and/or the carcass drum.

7. Turn-Up Device K

7.1 Overall Structure of the Turn-Up Device K

The tire building machine comprises a turn-up device K, the turn-up device K comprises: a building machine main shaft 13, an outer sleeve device A, a ply down finger assembly B, a bladder device C and a bead setting device D. The outer sleeve device A, the ply down finger assembly B and the bladder device C are all sleeved on the building machine main shaft 13, and the outer sleeve device A is located on the outer sides of the ply down finger assembly B and the bladder device C along the radial direction of the building machine main shaft 13; and the bead setting device D is located on the outer sleeve device A.

7.2 The Outer Sleeve Device of the Turn-Up Device

The outer sleeve device A comprises: an outer sleeve frame body 1, a auxiliary push sleeve 23 and a auxiliary push disk 5; the outer sleeve frame body 1 comprises a sleeving portion 30 and a supporting portion 31; the sleeving portion 30 is sleeved on the building machine main shaft 13; the supporting portion 31 is arranged on the sleeving portion 30; a auxiliary push disk driving device 2 (oil cylinder) is mounted at the outside of the supporting portion 31; and one end of the auxiliary push sleeve 23 is mounted at the end of the supporting portion 31, and the auxiliary push disk 5 is mounted on the other end of the auxiliary push sleeve 23.

The auxiliary push disk 5 is of an arc-shaped structure which is adapted to the shape of the tire, and the auxiliary push disk 5 is pushed by the auxiliary push disk driving device 2 (oil cylinder) to push the expanded bladder 8 in a shape adapted to the shape of the tire to the tire component so as to closely fit the tire component on the carcass drum.

7.3 The Ply Down Finger Assembly of the Turn-Up Device

The ply down finger assembly B comprises a finger paddle mounting sleeve 22, and the finger paddle mounting sleeve 22 is sleeved on the building machine main shaft 13; a finger paddle mounting seat 25 and a finger paddle push disk 24 are arranged on the finger paddle mounting sleeve 22, and a finger paddle 4 is mounted on the finger paddle mounting seat 25 in a hinging manner; a spring 3 is mounted on the finger paddle push disk 24; one end of the spring 3 is connected with the finger paddle 4; the finger paddle push disk 24 is driven by a finger paddle driving device 26; and the finger paddle driving device 26 is connected to the finger paddle push disk 24 and penetrates through the supporting portion 31 of the outer sleeve device A.

7.4 The Bladder Device of the Turn-Up Device

The bladder device C comprises a sealing inner sleeve 15, a sealing outer sleeve 16 and a connecting piece 12; the sealing inner sleeve 15 is sleeved on the building machine main shaft 13, and the sealing outer sleeve 16 is sleeved at the outside of the sealing inner sleeve 15; a cylinder body 27 is sleeved on the sealing outer sleeve 16; a bladder seat 17 is mounted on the cylinder body 27; and a bladder 8 is mounted on the bladder seat 17.

The bladder device C further comprises: a first chuck 32, a second chuck 33 and a bracket 18; the first chuck 32 and the second chuck 33 seal and fix the bladder 8 on the bladder seat 17; and the bracket 18 is mounted on the second chuck 33.

The bladder 8 comprises an inner rubber layer, an inner ply layer, an outer ply layer and an outer rubber layer from inside to outside, and a silica gel layer is arranged at a position corresponding to a bead on the outer side of the bladder 8; the components of the outer rubber layer comprises: 70-90% by mass of styrene-isobutylene-styrene and 10-30% by mass of polyamide, and the outer rubber layer is cooled at 10-100° C. for 100-260 seconds after being vulcanized; and the inner rubber layer 81 comprises an inner rubber layer I and an inner rubber layer II, which are independent from each other, are both made of natural rubber, have the same thickness, and are filled with carbon black.

In the conventional tire building device, the tire building bladder device is located on the building drum of the bladder drum building machine and is mainly used for performing turn-up building of a green tire. The existing tire building bladder is made of a natural rubber compound. The isolation layer of the tire building bladder is generally made of ordinary natural rubber and the like, so that the isolation effect is not good, and the bead is liable to be adhered to the bladder during the turn-up building of the tire, such that the green tire is difficult to detach, the surface of the carcass is uneven, and the defective percentage of the green tire is high. Meanwhile, the according portion of the bladder is damaged early due to the adhesion, thus reducing the available times of the bladder. However, the bladder in the present disclosure comprises a multilayer structure. It solves the problems that the bead and the bladder are liable to be adhered during the tire building, the surface of the bead is uneven, and the defective percentage is high; it also improves the available times of the bladder and the labor efficiency.

The carbon black is filled between the inner rubber layer I and the inner rubber layer II to improve the toughness and the strength of the bladder during inflation and to prolong the service life of the bladder.

Due to the special components of the outer rubber layer, the weight of the bladder is reduced, the air resistance and the air permeability of the bladder are improved, the adhesion performance with the other layers of the bladder is improved, and the service life and the toughness of the bladder are improved.

The outer rubber layer comprises 70-90% by mass of styrene-isobutylene-styrene and 10-30% by mass of polyamide polymers, and is cooled at 10-100° C. for 100-260 seconds after being vulcanized.

7.5 The Bead Setting Device D of the Turn-Up Device

The bead setting device D is mounted on the inner side of the other end of the auxiliary push sleeve 23; the bead setting device D comprises a bead setting driving device 6 and a clamping jaw 7; the clamping jaw 7 is driven by the bead setting driving device 6; and a bead setting portion is arranged at an end of the clamping jaw 7, and the bead setting portion is a circular arc surface or an inclined plane.

The bead setting portion is designed to be a circular arc surface or an inclined plane mainly for matching with the shape of the cross section of the bead ring at the end of the apex, therefore, in the bead setting process, the bead setting portion closely fits with the apex bead ring 40, so that the bead ring is not prone to loosening, is firmly and accurately combined with the bead body after the bead setting process, and generates no axial or radial offset after the bead setting device is removed, which improves the building quality of the tire.

7.6 The Bead Locking Device E of the Turn-Up Device

The bead locking device E comprises: a locking block 9, a sliding disk 11, a mandril 10, a cylinder body 27 (cylinder), a piston 28 and a supporting member 34; the sliding disk 11 is located at the outside of the sealing outer sleeve 16; the sliding disk 11 has an inclined plane, and the bottom of the mandril 10 abuts against the inclined plane of the sliding disk 11 through a rolling mechanism 35; the upper part of the mandril 10 is supported by the supporting member 34, and the supporting member 34 is fixedly connected to the cylinder body 27; the locking block 9 is arranged at the top of the mandril 10; the sliding disk 11 is connected with the end of the piston 28; the piston 28 is mounted on the outer side of the sealing outer sleeve 16, and the cylinder body 27 is mounted on the outer side of the piston 28.

The cylinder 27 is inflated to push the piston 28 to move toward the tire and then pushes the sliding disk 11 to move toward the tire. Then, the mandril 10 on the sliding disk 11 rises along the inclined plane, driving the locking block 9 and the bladder 8 to rise to lock the bead.

7.7 Other Devices of the Turn-Up Device

The tire building machine further comprises: a connecting rod 21 and a flange plate 20; one end of the connecting rod 21 is mounted on the flange plate 20, and the other end successively penetrates through the finger paddle mounting seat 25, the finger paddle push disk 24 and the supporting portion 31; and the flange plate 20 is connected with the sealing inner sleeve 15.

7.8 The building machine main shaft 13 of the turn-up device

The manufacturing method of the building machine main shaft 13 is as follows:

step 1: selecting the raw materials of the workpiece;

step 2: heating for the first time: placing the workpiece in a furnace for heating, keeping the temperature in the furnace at 1000-1200° C., and preserving the temperature for 3 hours;

step 3: building for the first time: taking out the workpiece from the furnace, and upsetting the workpiece to a first size by using upper and lower flat anvils via a wide anvil compaction forging method;

step 4: heating for the second time: placing the workpiece in the furnace for heating to conduct secondary recrystallization, normalizing and tempering, and then performing heating and cooling treatment for three times;

step 5: building for the second time: taking out the workpiece from the furnace, and upsetting the workpiece to a second size by using the upper and lower flat anvils via the wide anvil compaction forging method;

step 6: cutting, grinding and flaw detection: performing flaw detection and grinding on the workpiece with the second size, ensuring that the roughness of the ground place is higher than 12, and then performing flaw detection for the first time;

step 7: rough turning: performing rough turning, so that the roughness of the outer surface of the workpiece is higher than 15, and then performing flaw detection for the second time; and step 8: finish turning: performing finish turning to obtain a main shaft as a finished product.

In step 4, the secondary recrystallization, normalizing and tempering specifically comprises:

placing the workpiece in the furnace, ensuring that the temperature in the furnace is 400-420° C. when the workpiece is placed in the furnace, heating up to 900-950° C., preserving the temperature for 10 hours, wherein the temperature increment per hour is less than or equal to 850° C. in the heating up process, then cooling by air for 3 hours to reduce the furnace temperature to 300-350° C., and preserving the temperature for 10 hours;

afterwards, heating up to 800-900° C., preserving the temperature for 10 hours, wherein the temperature increment per hour is less than or equal to 50° C. in the heating up process, then by air cooling for 3 hours to reduce the furnace temperature to 300-350° C., and preserving the temperature for 10 hours; and thereafter, when the temperature in the furnace drops below 150° C., taking out the workpiece from the furnace.

The chemical element contents of the building machine main shaft 13 are as follows: C: 0.3-0.45%, Si: 0.27-0.35%, Mn: 0.80-1.50%, P: 0.01-0.020%, S: 0.002-0.020%, Cr: ≤1.20%, Ni: 0.15-0.30%, Mo: 0.23-0.25%, Cu: ≤0.15%, Al: 0.025-0.035%, and the balance is Fe.

Due to the above component selection and the building process of the building main shaft, the strength and the wear resistance of the building main shaft are improved, and the service life of the equipment is prolonged.

II. Transfer Process of the Tire Building Machine

In the building process of an all-steel radial tire, the carcass is generally directly transferred by a group of transfer rings, and due to the existence of the turn-up device, the carcass cannot be directly clamped from the carcass drum and transferred to the building drum. The present disclosure cleverly solves this problem.

The specific steps of conveying the first carcass assembly from the carcass drum to the building drum by using the tire building machine are as follows:

Step 1, preparation: the entire tire building machine is at a waiting position, and the turn-up device K faces to the carcass drum; the oil cylinder on the supporting device retracts back to take back the roller and to cause the roller to leave the balance seat; and then, the rotating device rotates 180 degrees, so that the transfer ring device faces to the carcass drum.

Step 2, clamping: the oil cylinder on the supporting device extends out, so that the roller is supported on the balance seat, and the tire building machine moves toward the carcass drum; when the first carcass assembly is located in the transfer ring device, the first carcass transfer device stops moving; and then, the transfer ring device clamps the first carcass assembly located on the carcass drum.

Step 3: transfer: the tire building machine moves toward the building drum, and after the transfer ring device leaves the carcass drum, the oil cylinder on the supporting device retracts back to take back the roller and to cause the roller to leave the balance seat; and then, the rotating device rotates 180 degrees, so that the turn-up device K faces to the carcass drum; and the oil cylinder on the supporting device extends out, so that the roller is supported on the balance seat, and the tire building machine moves toward the building drum.

Step 4, release: after the transfer ring device sleeves the first carcass assembly on the building drum, the tire building machine stops moving; and then, the transfer ring device releases the green tire and sleeves the first carcass assembly on the building drum.

Step 5, wait: the tire building machine moves toward the carcass drum and moves to the waiting position.

III. Turn-Down and Turn-Up Building Processes

1. The turn-down and/or turn-up process is performed on the carcass by using the mentioned turn-up building device, and comprises the following steps:

step 1: sleeving a carcass assembly on a carcass drum;

step 2: respectively performing turn-down on the two sides of the carcass assembly by using a first turn-up device and a second turn-up device;

step 3: respectively performing bead setting on the two sides of the carcass assembly by using the first turn-up device and the second turn-up device;

step 4: respectively performing bead locking on the two sides of the carcass assembly by using the first turn-up device and the second turn-up device;

step 5: respectively performing turn-up on the two sides of the carcass assembly by using the first turn-up device and the second turn-up device; and step 6: completing all turn-up processes of the carcass assembly to obtain a first carcass assembly.

2. The turn-down procedure in step 2 comprises a step 2.1:

the turn-up device moves integrally along the axial direction of the building machine main shaft 13 toward the carcass drum, and the outer sleeve device A stops moving when the turn-up device arrives at a first distance away from the carcass drum; however, the ply down finger assembly B and the device thereon, the bladder device C and the device thereon continue to move along the axial direction of the building machine main shaft 13 toward the carcass drum; at this time, the finger paddle 4 on the ply down finger assembly B rotates along a hinge shaft, and the top thereof scatters; and the edge portion of the carcass assembly to be subjected to the turn-up procedure is just located on the inner side of the finger paddle 4.

3. The turn-down procedure in step 2 comprises a step 2.2, which is executed after step 2.1:

the outer sleeve device A moves toward the carcass drum, and the auxiliary push sleeve 23 on the outer sleeve device A comes into contact with the finger paddle 4, so that the finger paddle rotates around the hinge shaft and tucks; and in the tucking process, the finger paddle abuts the edge portion of the carcass assembly against the bladder 8.

At this time, the finger paddle 4 tucks to clamp the edge portion of the carcass assembly between the finger paddle 4 and the bladder 8, and the edge portion of the carcass assembly is continuously pressed toward the axle center of the building machine main shaft 13 with the tucking of the finger paddle 4.

4. The bead setting step in step 3 comprises:

an apex bead ring is arranged at an end of the clamping jaw 7 of the bead setting device 6; the bead setting driving device 6 pushes the clamping jaw 7, and the clamping jaw 7 pushes the apex bead ring 40 to the set position of the carcass assembly; and then, the clamping jaw 7 returns to the original position under the drive of the bead setting driving device 6, thus completing the bead setting operation; and after the above step, the outer sleeve device A and the ply down finger assembly B simultaneously move toward a direction away from the carcass drum for a distance.

5. The bead locking step in step 4 comprises:

the piston 28 moves toward the carcass drum, then pushes the sliding disk 11 toward the carcass drum along the axial direction, so that the mandril 10 rises, and the locking block 9 at the top of the mandril 10 closely abuts the bladder 8 against the carcass assembly.

6. The turn-up step in step 5 comprises:

the bladder 8 is inflated to expand and pushes the carcass assembly upward and toward the carcass drum, and at the same time, the auxiliary push disk 5 pushes the expanded bladder 8 to the carcass drum so as to turn up the carcass assembly to the outer side of the apex bead ring 40, thus completing the turn-up process.

The first turn-up device is the turn-up device K on the first carcass transfer device located on one side of the carcass drum, and the second turn-up device is a turn-up device K' on the other side of the carcass drum, and the turn-up device K' has the same structure and working mode as the turn-up device K.

The above technical solutions are only one embodiment of the present disclosure, those skilled in the art can easily make various types of improvements or modifications based on the principles of the present disclosure, instead of being limited to the descriptions of the above specific embodiments of the present disclosure, therefore, the foregoing descriptions are only preferred, but have no restrictive significance.

Further, the above described embodiment is an exemplary embodiment of the present disclosure, but the embodiment of the present disclosure is not limited to the above described embodiment. Any other changes, modifications, substitutions, combinations, and simplifications made without departing from the spirit and scope of the disclosure should be equivalent replacements and be included in the scope of the present disclosure.

What is claimed is:

1. A turn-up device, comprising a building machine main shaft, an outer sleeve device, a ply down finger assembly, a bladder device, a bead setting device, and a bead locking device, wherein:
   the outer sleeve device, the ply down finger assembly and the bladder device are all sleeved on the building machine main shaft, and the outer sleeve device is located on outer sides of the ply down finger assembly and the bladder device along a radial direction of the building machine main shaft; and the bead setting device is located on the outer sleeve device;
   wherein the bladder device comprises:
      a sealing inner sleeve sleeved on the building machine main shaft;
      a sealing outer sleeve sleeved at an outer side of the sealing inner sleeve; and
      a bladder seat configured to mount a bladder;
   wherein the bead locking device comprises:
      a cylinder body mounted on an outer side of the sealing outer sleeve, the bladder seat is mounted on the cylinder body;
      a chamber formed by the cylinder body and the sealing outer sleeve;
      a piston partially mounted in the chamber and having an axial end outside the chamber;
      a sliding disk connected to the axial end of the piston and having an inclined plane, the sliding disk is entirely located outside the chamber;
      a supporting member fixedly connected to the cylinder body;
      a mandril passing radially through the supporting member, a bottom of the mandril abuts against the inclined plane through a rolling mechanism; and
      a locking block located on a radially inner side of the bladder and arranged at a top of the mandril.

2. The turn-up device according to claim 1, wherein the outer sleeve device comprises an outer sleeve frame body, a auxiliary push sleeve and a auxiliary push disk; the outer sleeve frame body comprises a sleeving portion and a supporting portion; the sleeving portion is sleeved on the building machine main shaft; the supporting portion is arranged on the sleeving portion; a auxiliary push disk driving device is mounted at the outside of the supporting portion; one end of the auxiliary push sleeve is mounted at one end of the supporting portion, and the auxiliary push disk is mounted on the other end of the auxiliary push sleeve.

3. The turn-up device according to claim 2, wherein the ply down finger assembly comprises a finger paddle mounting sleeve, and the finger paddle mounting sleeve is sleeved on the building machine main shaft; a finger paddle mounting seat and a finger paddle push disk are arranged on the finger paddle mounting sleeve, and a finger paddle is mounted on the finger paddle mounting seat in a hinging manner; a spring is mounted on the finger paddle push disk; one end of the spring is connected with the finger paddle; the finger paddle disk is driven by a finger paddle driving device; and the finger paddle driving device is connected to the finger paddle push disk and penetrates through the supporting portion of the outer sleeve device.

4. The turn-up device according to claim 1, wherein the bladder device further comprises a first chuck, a second chuck and a bracket; the first chuck and the second chuck seal and fix the bladder on the bladder seat; and the bracket is mounted on the second chuck.

5. The turn-up device according to claim 2, wherein the bead setting device is mounted on an inner side of the other end of the auxiliary push sleeve; the bead setting device comprises a bead setting driving device and a clamping jaw; the clamping jaw is driven by the bead setting driving device; a bead setting portion is arranged at an end of the clamping jaw, and the bead setting portion is a circular arc surface or an inclined plane.

6. The turn-up device according to claim 3, further comprising a connecting rod and a flange plate, wherein one end of the connecting rod is mounted on the flange plate, and the other end successively penetrates through the finger paddle mounting seat, the finger paddle push disk and the supporting portion; and the flange plate is connected with a sealing inner sleeve.

* * * * *